United States Patent [19]

Singer et al.

[11] Patent Number: 5,889,843
[45] Date of Patent: Mar. 30, 1999

[54] METHODS AND SYSTEMS FOR CREATING A SPATIAL AUDITORY ENVIRONMENT IN AN AUDIO CONFERENCE SYSTEM

[75] Inventors: Andrew Jay Singer; Sean Michael White, both of Palo Alto; Glenn T. Edens; Roger C. Meike, both of Redwood City; Don Charnley, Woodside; Debby Hindus, San Francisco; Wayne Burdick, Belmont, all of Calif.; Lisa Stifelman, Cambridge, Mass.

[73] Assignee: Interval Research Corporation, Palo Alto, Calif.

[21] Appl. No.: 610,638

[22] Filed: Mar. 4, 1996

[51] Int. Cl.$^6$ .............................. H04M 3/56; H04R 5/00; H04S 1/00
[52] U.S. Cl. ..................... 379/202; 370/266; 379/206; 381/1; 381/17
[58] Field of Search .............................. 348/13, 14, 15; 370/62, 260, 263, 266, 267, 268, 269; 379/202, 203, 204, 205, 206; 381/17, 25, 1, 24, 26

[56] References Cited

U.S. PATENT DOCUMENTS

| | | |
|---|---|---|
| 4,516,156 | 5/1985 | Fabris et al. ............................. 348/15 |
| 4,645,872 | 2/1987 | Pressman et al. ........................ 348/15 |
| 4,734,934 | 3/1988 | Boggs et al. ......................... 379/206 X |
| 4,953,159 | 8/1990 | Hayden et al. .......................... 370/265 |
| 5,020,098 | 5/1991 | Celli ........................................ 379/202 |
| 5,335,011 | 8/1994 | Addeo et al. ....................... 379/206 X |
| 5,347,306 | 9/1994 | Nitta .......................................... 348/15 |
| 5,438,623 | 8/1995 | Begault .................................... 381/17 |
| 5,491,743 | 2/1996 | Shiio et al. ............................. 379/202 |

Primary Examiner—Harry S. Hong
Attorney, Agent, or Firm—Brooks & Kushman

[57] ABSTRACT

A method and a system for audio communication between a plurality of users at a plurality of sites utilizes a set of audio input sensors at each site. Each set of audio input sensors binaurally senses an auditory space in proximity thereto. A metaphorical representation of each of the sites is provided. Each metaphorical representation has a position which is variable within a metaphorical space. The metaphorical representations can be based upon, for example, a physical metaphor, a visual metaphor, an auditory metaphor, or a textual metaphor. The auditory space sensed at each site is combined to form at least one synthetic auditory space. The at least one synthetic auditory space is formed in dependence upon the position of each metaphorical representation within the metaphorical space. A binaurally perceivable auditory environment is produced at one or more sites based upon the at least one synthetic auditory space.

70 Claims, 6 Drawing Sheets

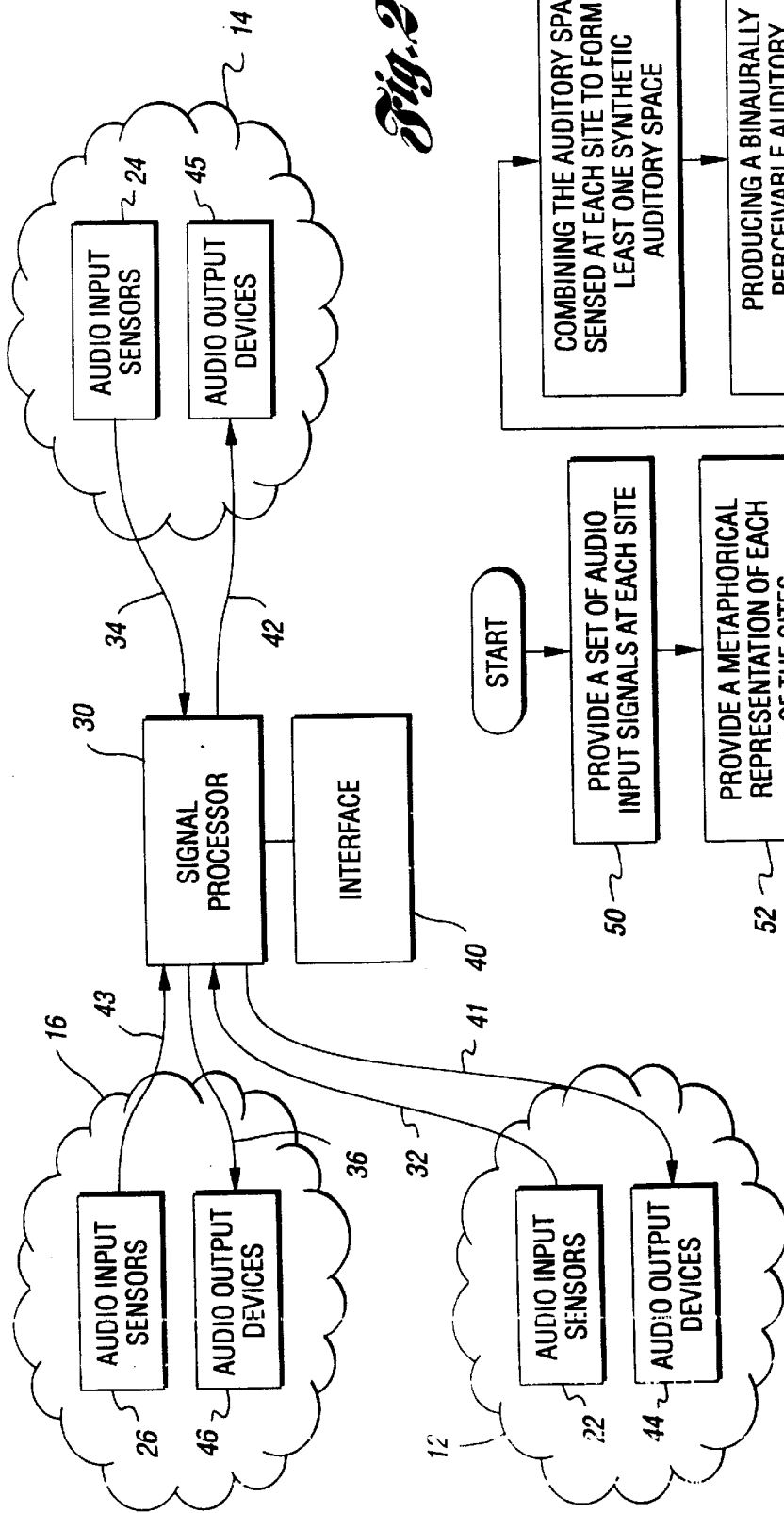
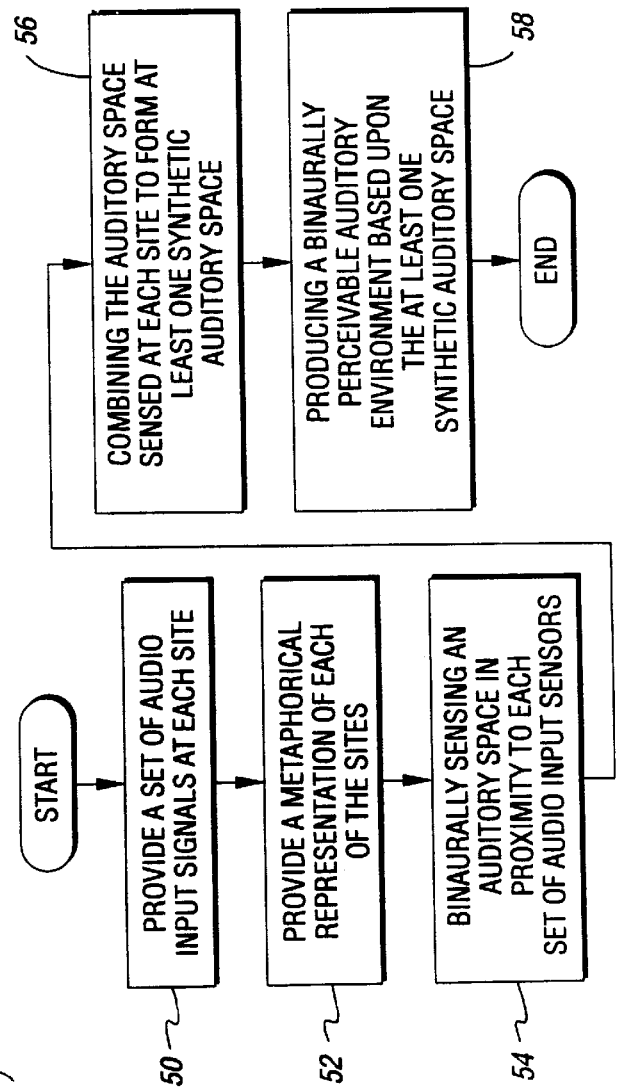

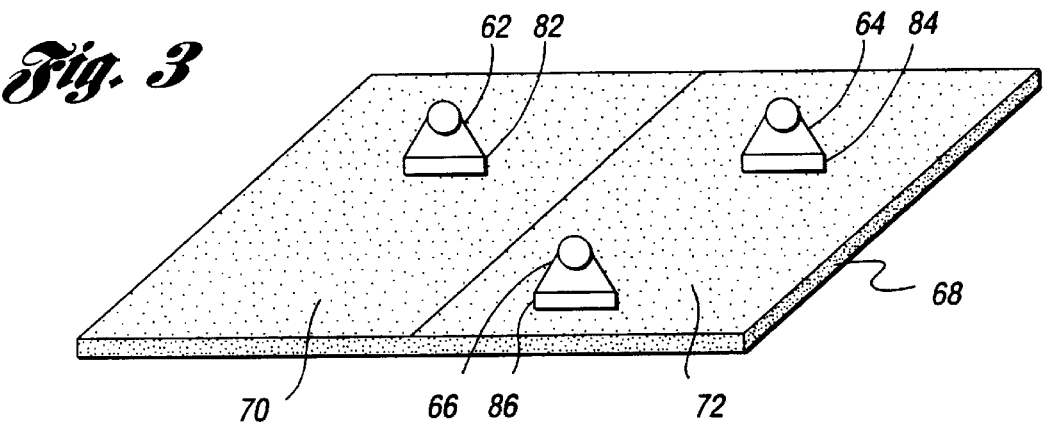
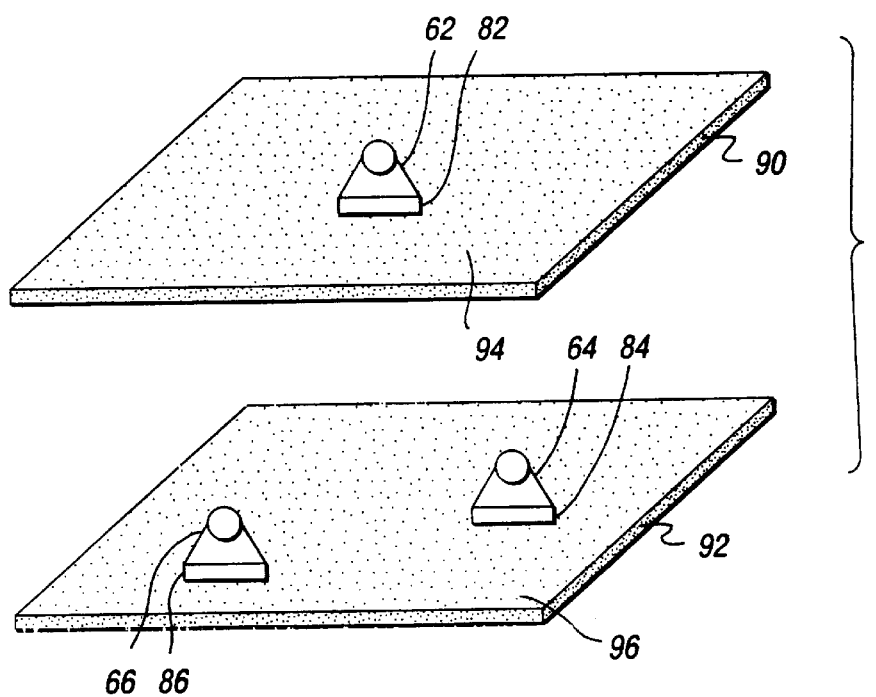
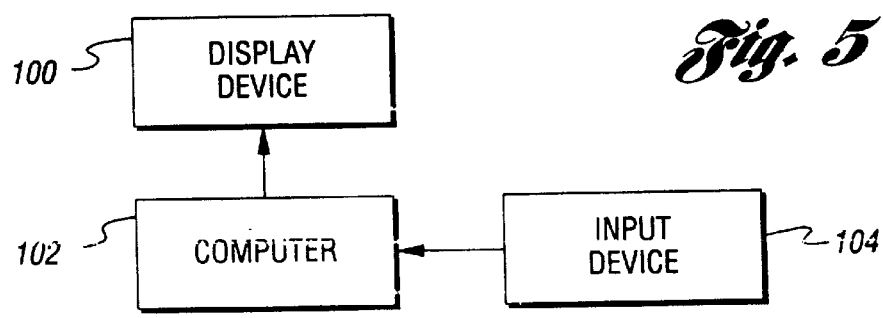

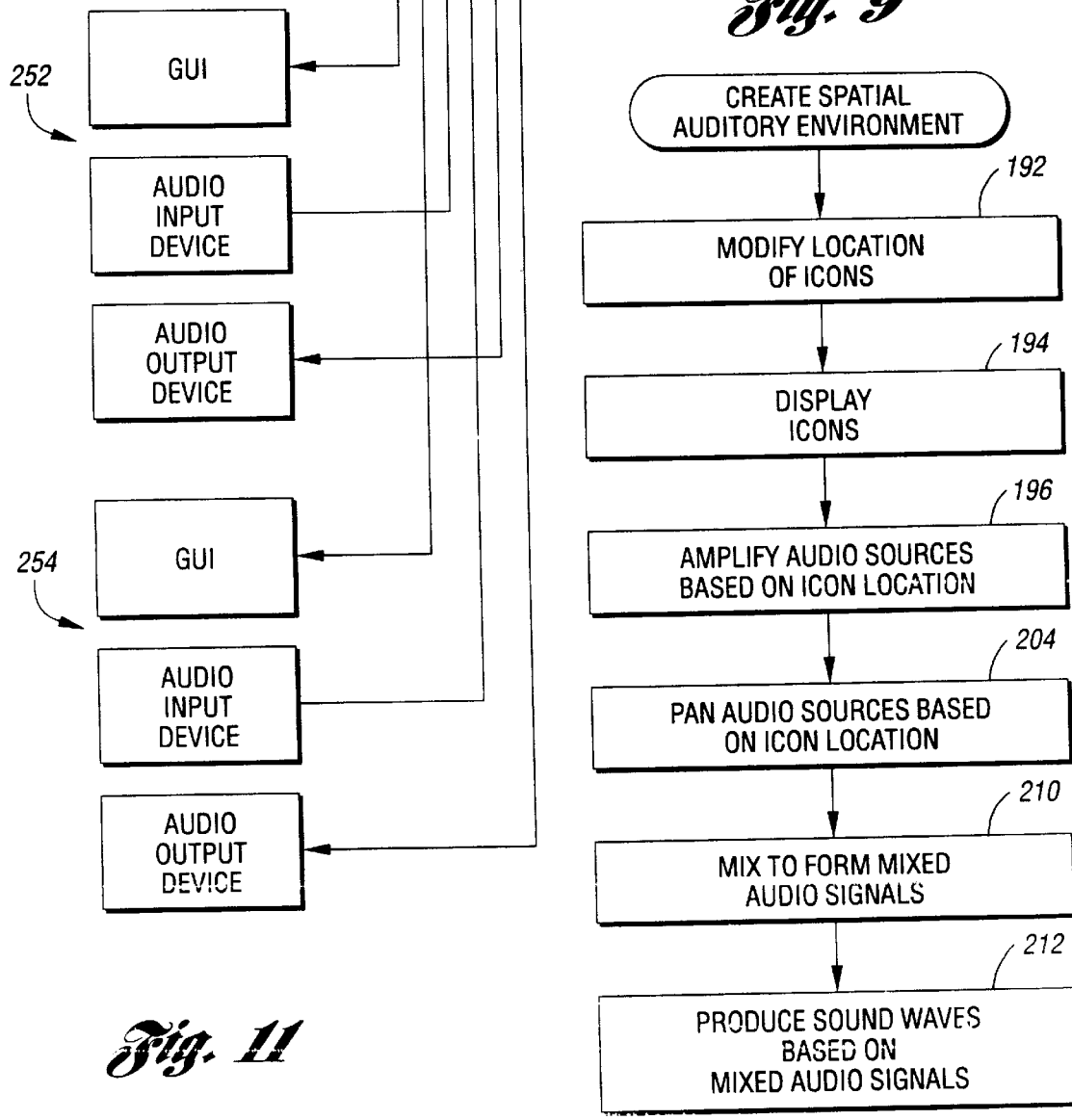

METHODS AND SYSTEMS FOR CREATING A SPATIAL AUDITORY ENVIRONMENT IN AN AUDIO CONFERENCE SYSTEM

TECHNICAL FIELD

The present invention relates to methods and systems for use with audio conferencing systems.

BACKGROUND ART

Teleconferencing systems allow people at different locations to meet and converse as if they were in the same room. For business applications, this is particularly beneficial in that it produces improved productivity and reduced travel time and cost. Teleconferencing systems are currently employed in such applications as business meetings, sales meetings, and technical information exchanges.

A generic teleconferencing apparatus provides a user with a corresponding bidirectional audio communication link with each of a plurality of external transceivers. The teleconferencing apparatus contains an audio output device, such as a speaker, capable of producing sound waves based upon audio signals received from the external transceivers. The teleconferencing apparatus further contains an audio input device, such as a microphone, capable of producing an audio signal from sound waves received thereby for transmission to the plurality of external transceivers.

Several teleconferencing systems are known in the art. U.S. Pat. No. 4,516,156 to Fabris et al. discloses an audio/video conferencing system which uses a touch sensitive screen for controlling video images generated from remotely-located cameras. U.S. Pat. No. 4,953,159 to Hayden et al. discloses an audio graphics conferencing arrangement which includes a computer interface for setting up and controlling interconnections. U.S. Pat. No. 4,645,872 to Pressman et al. discloses a teleconferencing system wherein a user at a station has control of selectively interconnecting with each other station.

SUMMARY OF THE INVENTION

The need exists for an audio conferencing system which provides a user-controllable spatialized auditory environment based upon audio signals received from external transceivers.

It is thus an object of the present invention to provide an audio conferencing system capable of producing a spatialized auditory environment.

A further object of the present invention is to provide a conceptually-consistent user interface which controls the spatialized auditory environment in an audio conferencing system.

In carrying out the above objects, the present invention provides a method of audio communication between a plurality of users at a plurality of sites. The method includes a step of providing a set of audio input sensors at each site. An auditory space in proximity to each set of audio input sensors is binaurally sensed. The method further includes a step of providing a metaphorical representation of each of the sites. Each metaphorical representation has a position which is variable within a metaphorical space. A step of combining the auditory space sensed at each site is performed to form at least one synthetic auditory space. The at least one synthetic auditory space is formed in dependence upon the position of each metaphorical representation within the metaphorical space. A binaurally perceivable auditory environment is produced at each site based upon the at least one synthetic auditory space.

Further in carrying out the above objects, the present invention provides a system for audio communication between a plurality of users at a plurality of sites which performs the steps of the above-described method.

Still further in carrying out the above objects, the present invention provides a system for use with an audio conferencing apparatus. The audio conferencing apparatus provides a user with a corresponding bidirectional audio communication link with each of a plurality of external transceivers, the audio conferencing apparatus containing an audio output device capable of producing sound waves from a first audio signal applied thereto, the audio conferencing apparatus further containing an audio input device capable of producing a second audio signal from sound waves received thereby for transmission to the plurality of external transceivers. The system comprises a graphical user interface which displays a corresponding icon for each of the external transceivers at a corresponding location in a display space, wherein the corresponding location of each icon is capable of being modified by the user. The system further comprises a processor, operatively associated with the graphical user interface, which generates a control signal in dependence upon the corresponding location of each icon with respect to a reference location. The system also comprises an audio mixer, operatively associated with the processor, which variably amplifies and variably pans a corresponding audio signal received from each of the plurality of external transceivers in dependence upon the control signal, and forms a mixed audio signal from a combination thereof. The mixed audio signal is applied to the audio output device to create a spatial auditory environment based upon the audio signals received from the plurality of external transceivers.

Yet still further in carrying out the above objects, the present invention provides a method of bidirectional communication with each of a plurality of external transceivers. A first audio signal is transmitted to each of the plurality of external transceivers. A corresponding icon for each of the external transceivers is displayed at a corresponding location in a display space. A corresponding audio signal from each of the plurality of external transceivers is received. Each corresponding audio signal is amplified and panned in dependence upon the corresponding location of the corresponding icon with respect to a reference location. The amplified and panned corresponding audio signals are mixed to form a mixed audio signal. The mixed audio signal is applied to an audio output device to create a spatial auditory environment based upon the audio signals received from the plurality of external transceivers.

These and other features, aspects, and embodiments of the present invention will become better understood with regard to the following description, appended claims, and accompanying drawings.

BRIEF DESCRIPTION OF THE DRAWINGS

FIG. 1 is a block diagram of an embodiment of the system for audio communication between a plurality of users at a plurality of sites;

FIG. 2 is a flow chart of a method of audio communication between a plurality of users at a plurality of sites;

FIG. 3 is an illustration of a first embodiment of an interface for use in the present invention;

FIG. 4 illustrates an alternative embodiment of an interface for use in the present invention;

FIG. 5 is a block diagram of another embodiment of the interface for use in the present invention;

FIG. 9 is a flow chart of a method of creating a virtual auditory environment;

FIG. 11 is a block diagram of an alternative embodiment of an audio conferencing system in accordance with the present invention.

BEST MODES FOR CARRYING OUT THE INVENTION

Figure 6:
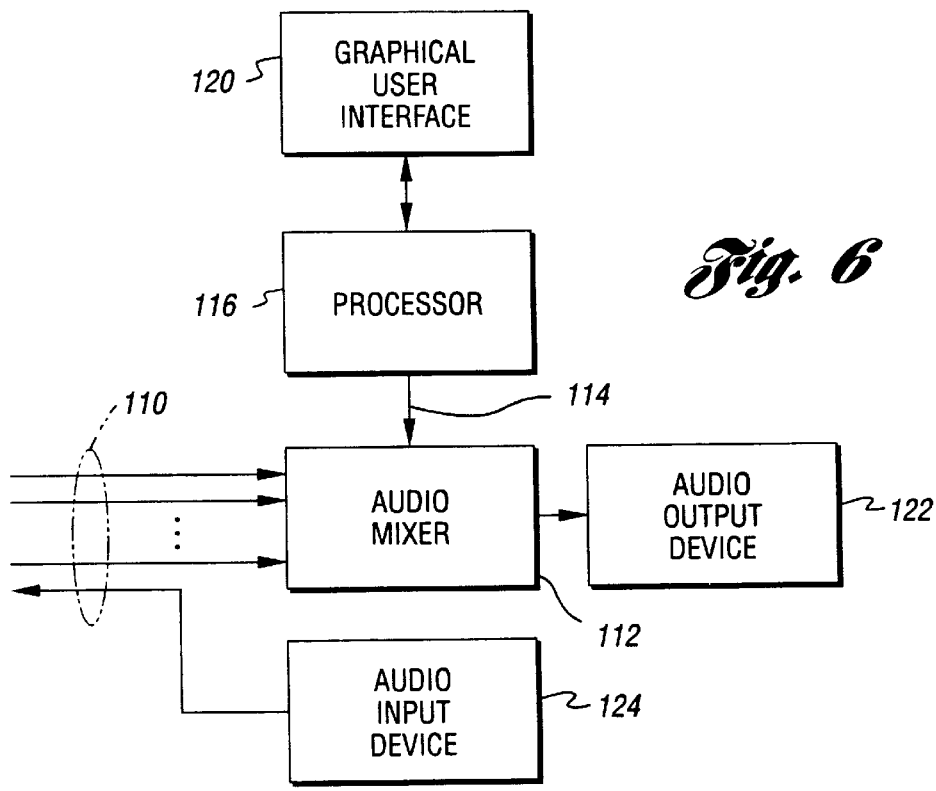
FIG. 6 is a block diagram of an embodiment of the present invention.

FIG. 1 is a block diagram of an embodiment of a system for audio communication between a plurality of users at a plurality of sites. For the purpose of illustration, the system is described in terms of three sites 12, 14, and 16, although embodiments of the present invention are not limited thereto. Each of the sites 12, 14, and 16 has a corresponding set of audio input sensors 22, 24, and 26 for binaurally sensing an auditory space in proximity thereto. As illustrated, the set of audio input sensors 22 binaurally senses an auditory space at the site 12, the set of audio input sensors 24 binaurally senses an auditory space located at the site 14, and the set of audio input sensors 26 binaurally senses an auditory space located at the site 16. It is noted that "binaurally sensing" is indicative of either sensing or synthesizing an auditory space with sufficient phase quality and accuracy to enable binaural perception at a distant location.

Binaural sensing can be performed using a variety of different audio input sensors in a variety of different configurations. In one embodiment, binaural sensing is performed using a plurality of microphones configured to capture a spatial representation of the auditory space being sensed. The plurality of microphones may include a pair of microphones, a quadraphonic array of microphones, or an octophonic array of microphones, for example. Regardless of the number of microphones employed, the microphones are preferably configured to capture multipath reflections generated within the auditory space. In one such configuration, a pair of microphones are configured to simulate an average intracranial distance between two human ears. In general, the configuration of the microphones need not be fixed.

Alternatively, a plurality of audio input sensors which physically simulate a typical binaural human head-related transfer function may be employed to capture a spatial representation of the auditory space. As another alternative, binaural sensing may be performed using a pair of displacement sensors which sense the displacement of a pair of in vivo tympanic membranes in response to an auditory space in proximity thereto. Methods and systems for binaural sensing in this manner are disclosed in the copending U.S. patent application entitled "Wearable Apparatus For Measuring Displacement Of An In-Vivo Tympanum And Methods And Systems For Use Therewith", having Ser. No. 08/475,349, assigned to the same assignee of the present application and hereby incorporated by reference.

In another embodiment, the auditory space at a site is binaurally synthesized using a single microphone and an audio signal processor. Here, the audio signal processor synthesizes the auditory space with sufficient phase quality and accuracy to enable a binaural perception thereof at a distant location. The audio signal processor can form the auditory space by artificially imposing a predetermined stereo or binaural human head-related transfer function. As a result, a three-dimensional audio space can be formed by a single monophonic source.

Signals representative of the auditory spaces sensed at each of the sites 12, 14, and 16 are transmitted from the audio input sensors 22, 24, and 26 to a signal processor 30 via transmission links 32, 34, and 36. The transmission links 32, 34, and 36 may comprise an electrical cable (such as coaxial cable or twisted pair), an optical fiber, free space, or any other medium suited for carrying the signals. Transmission over the transmission links may be accomplished using baseband electrical signals representative of the auditory spaces, broadband electrical signals having a modulated carrier, or modulated light signals.

In general, the signals representative of the sensed auditory spaces may be transmitted in either an analog form or a digital form. The digital form may be a suitably encoded or compressed representation of digital data representative of the sensed auditory space.

The signal processor 30 combines the auditory space sensed at each of the sites 12, 14, and 16 in dependence upon control signals provided to the signal processor 30 by an interface 40. The interface 40 provides a metaphorical representation of each of the sites 12, 14, and 16 within a metaphorical space. The position of each metaphorical representation is variable within the metaphorical space. Based upon the position of the metaphorical representations within the metaphorical space, the signal processor 30 forms at least one synthetic auditory space.

In various embodiments of the present invention, the metaphorical space is delineated into a plurality of subspaces for metaphorically representing each synthetic auditory space. Each synthetic auditory space is formed by combining the auditory space of sites having metaphorical representations contained within its respective subspace. Further, an auditory space sensed at one site can be produced at a binaurally perceived position at another site dependent upon the position of the metaphorical representation of the one site within the metaphorical space.

The signal processor 30 can include one or more analog audio mixers and/or one or more digital audio processors for composing the synthetic auditory environments. In addition to mixing, the signal processor 30 can shape the frequency response, encrypt the signals for security reasons, add background sounds, perform automatic gain control, and perform feedback control operations, and provide stereo and spatial enhancement operations. The digital audio processors may employ time or space division multiplexing of signals to accomplish the many-to-many mixing task which is performed.

Signals representative of the at least one synthetic auditory space are communicated to the sites 12, 14, and 16 via transmission links 41, 42, and 43, respectively. As with the transmission links 32, 34, and 36, the transmission links 41, 42, and 43 can comprise an electrical cable, an optical fiber, free space, or another suitable medium. The signals can be in the form of either baseband or broadband signals.

Each of the sites 12, 14, and 16 has a respective set of audio output devices 44, 45, and 46 which produce a binaurally-perceivable auditory environment based upon a synthetic auditory space signal therefor. Each set of audio output devices can include an array of speakers, such as stereo, quadraphonic, or octophonic array, which present the synthetic auditory environment at the site. Alternatively, the set of audio output devices can be in the form of headphones including overear headphones, in-ear headphones, bone conduction phones, or near-field phones.

As another alternative, the set of audio output devices can provide means to servo the tympanic membranes of a user. Methods and systems to servo the tympanic membranes of an individual are described in copending U.S. patent application Ser. No. 08/475,349.

Although illustrated in terms of a central system, the signal processor 30 can also have a distributed form wherein a plurality of signal processing subsystems are employed. Here, each site can include a signal processing subsystem which works in conjunction with a central signal processor that transmits only the subset of available sources that is wanted by the site. The signal processing subsystem performs the combining of the subset of available sources which are requested.

Turning now to FIG. 2, there is shown a flow chart of a method of audio communication between a plurality of users at a plurality of sites in accordance with the present invention.

As indicated by block 50, the method includes a step of providing a set of audio input sensors at each site. As indicated by block 52, a step of providing a metaphorical representation of each of the sites is performed. Each metaphorical representation has a position which is variable within a metaphorical space. A step of binaurally sensing an auditory space in proximity to each set of audio input sensors is performed as indicated by block 54. As indicated by block 56, a step of combining the auditory space sensed at each site is performed to form at least one synthetic auditory space. The at least one synthetic auditory space is formed in dependence upon the position of each metaphorical representation within the metaphorical space. A step of producing a binaurally perceivable auditory environment at each site based upon the at least one synthetic auditory space is performed as indicated by block 58.

Referring to FIG. 3, there is shown a first embodiment of an interface for use in the present invention. In this embodiment of the interface, the metaphorical representations are in the form of physical representations of each of the sites. For example, the interface can include a set of physical objects, each of which represent a person or group. The physical objects can be either literal, near-literal, or arbitrary representations of the individuals or groups. Further, the physical objects may be in any scale relative to the individuals or groups which they represent.

In this embodiment, the interface includes a plurality of physical objects for metaphorically representing each of the plurality of sites. Each physical object has a position which is variable within a physical space. For the purpose of illustration, three physical objects 62, 64 and 66 which metaphorically represents the sites 12, 14 and 16 in FIG. 1 are shown. The physical objects 62, 64 and 66 are positioned on a planar surface 68 which provides the physical space. The physical space is delineated into two subspaces 70 and 72 to represent two auditory spaces which are to be synthesized.

The physical objects 62, 64 and 66 each include a respective sensor 82, 84 and 86 for sensing the positions thereof within the physical space. The sensors 82, 84 and 86 can sense the position of the physical objects 62, 64 and 66 using either optical sensors, electromagnetic sensors, electrical sensors, mechanical sensors, or ultrasonic sensors. Preferably, the sensors 82, 84 and 86 provide dynamic position sensing so that changes in the physical location of each object relative to the subspaces 70 and 72 can be determined expeditiously. By dynamically sensing the physical location of each object, the synthetic auditory spaces can be changed dynamically to reflect the configuration of the objects with respect to the subspaces 70 and 72.

FIG. 4 illustrates an alternative embodiment of an interface which utilizes physical metaphorical representations. Here, the interface includes multiple planes 90 and 92 which delineate a physical space into two subspaces 94 and 96. The subspace 94 is representative of one synthetic auditory space and the subspace 96 is representative of another synthetic auditory space. It is noted that although only two planar surfaces 90 and 92 are illustrated in FIG. 4, alternative embodiments may utilize any number of planar surfaces to provide the metaphorical space.

As an alternative to the two-dimensional physical metaphorical spaces provided by the planar surfaces in FIGS. 3 and 4, the position of the physical objects can be sensed within an arbitrary three-dimensional space. This three-dimensional space can be delineated in a predetermined manner to represent any number of synthetic auditory spaces which are to be formed.

Turning now to FIG. 5, there is shown an embodiment of the interface which utilizes a visual metaphorical representation of each of the plurality of sites. The interface includes a display device 100 on which at least one graphical object is displayed. The at least one graphical object metaphorically represents at least one of the plurality of sites. Preferably, a plurality of graphical objects are displayed, each of the graphical objects corresponding to a respective one of the plurality of sites. The display device 100 is driven by a computer 102 having an input device 104. The input device 104 can include a pointing device such as a mouse, a trackball, a touchscreen, a pen, or the like, for variably positioning the at least one graphical object on the display device 100. The computer 102 provides means for determining the position of each graphical object on the display device 100.

In preferred embodiments of this form, the display device 100 displays a set of graphical objects which are either literal, near-literal, or arbitrary representations of a plurality of individuals or groups. The display device 100 further displays a delineated area or set of areas which each represent a corresponding auditory space or spaces to be synthesized. The areas may be delineated on the entire screen of the display device 100. Alternatively, the areas may be delineated in a window or multiple windows on the screen, or in a simulated three-dimensional representation of space on the screen of the display device 100.

The location of each of the objects relative to the delineated area or areas on the screen is manipulated by a user using the input device 104. The positions of the objects are used to cause the corresponding synthetic auditory spaces to be changed dynamically to reflect configuration of the objects with respect to the delineated areas.

It is noted that the objects may be in any scale relative to the individuals or groups which they represent. Further, multiple objects may be utilized to represent different aspects of an individual's or a group's interaction with a synthetic auditory space. For example, one object may represent an individual's or group's contributing to a synthetic auditory space, whereas a second object represents an individual's or group's ability to listen to a synthetic auditory space.

The interface illustrated in FIG. 5 can also be utilized to provide a textual metaphorical representation for the plurality of sites. Here, the computer 102 executes a control program which maintains a state space model of at least one mnemonic object. The at least one mnemonic object metaphorically represents at least one of the sites. Preferably, the control program maintains state space models for a plurality of mnemonic objects which represent the plurality of sites. The input device 104 provides a means for receiving a textual command for modifying the state of the at least one mnemonic object within the state space model. The display device 100 provides means for displaying a textual indication of the state of the at least one mnemonic object within the state space model.

More specifically, the computer 102 receives textual commands via the input device 104. Textual communication may be accomplished by the depression of buttons within the input device 104. Here, the buttons may be labeled with the commands which are to be issued by the user. Alternatively, the input device 104 can include a pointing device such as a mouse, trackball, pen, touch screen, or body position sensor to facilitate selecting of commands displayed on the display device 100. As another alternative, textual communication can be accomplished by typing the commands on a keyboard within the input device 104. A further alternative is to employ a speech recognition apparatus within the input device 104 to allow a spoken entry of commands.

The textual commands received by the computer via the input device 104 are used to modify the state space model. The state of each mnemonic object relative to a mnemonically-represented delineated area or set of areas is used to dynamically change the formation of the at least one synthetic auditory space defined by the delineated areas.

As with the previously described embodiments of the interface, the mnemonic objects may be literal, near literal, or arbitrary representations of the individuals or groups associated with the sites. Further, the mnemonic objects may be in any mnemonic relationship to the people or spaces they represent. Also, multiple objects may represent different aspects of an individual's or group's interaction with the synthetic auditory space, such as only contributing to the synthetic auditory space or only being able to listen to the synthetic auditory space.

Embodiments of the interface may also utilize an auditory metaphor to metaphorically represent each of the sites. Here, the interface includes an auditory display on which a set of auditory objects, together with a delineated area or set of areas are displayed.

Preferred embodiments of the present invention which utilize visual metaphorical representations will now be presented. It is noted that the teachings of these preferred embodiments may also be applied in conjunction with the other metaphorical representations described herein.

An embodiment of a system for creating a spatial auditory environment for use with an audio conferencing apparatus is illustrated by the block diagram in FIG. 6. A plurality of audio sources 110 is applied to an audio mixer 112. Examples of the audio sources 110 include an audio signal from a remotely-located person speaking into a microphone, a telephone receiver, a music playback system, a radio, and audio from a television. The audio mixer 112 is capable of variably amplifying and variably panning each of the audio sources 110 in dependence upon a received control signal along a control line 114. The control signal is generated by a processor 116 responsive to a graphical user interface 120.

The graphical user interface 120 is capable of displaying a representative icon for each of the audio sources 110 at corresponding locations in a display space. The display space can be displayed on a two-dimensional display device, such as a computer monitor, or any higher-dimensional equivalent thereof. The graphical user interface 120 is further capable of allowing a user to modify the corresponding location of each representative icon. Such a modification can be performed by a standard click-and-drag operation using either a computer mouse, a trackball, or a joystick, or an alternative operation using an alternative control device. The reference location of the user in the spatial auditory environment is represented by a reference icon. In a similar manner as with the audio source icons, the location of the reference icon can be -modified using the graphical user interface 120 so that the virtual location of the user in the spatial auditory environment is modified.

In response to modifications performed using the graphical user interface 120, the processor 116 generates the control signal in dependence upon the corresponding location of each icon with respect to the reference location. The control signal contains a first signal for controlling the amplification of each of the audio sources 110 by the audio mixer 112. The first signal is formed such that each of the audio sources 110 is amplified in dependence upon a distance between the corresponding location of the corresponding icon and the reference location. Various distance measures can be employed for this purpose; preferred embodiments incorporate either a Cartesian distance measure or a distance measured along a predetermined coordinate axis. The Cartesian distance measure is defined as the square root of the sum of the squared differences in each coordinate display axis between the corresponding location of an audio source icon and the reference location. More generally, the distance measure can be based on any mathematical metric, such as the general p-norm metric defined as the pth root of the sum of coordinate differences raised to the pth power. Regardless of the metric employed, the variable amplification of each of the audio sources 110 acts to relatively increase the audible intensity of audio sources having representative icons closer to the reference icon, and to relatively decrease the intensity of sources with icons further from the reference icon.

The control signal further contains a second signal for controlling the panning of each of the audio sources 110 by the audio mixer 112. The second signal is formed such that each of the audio sources 110 is panned in dependence upon an orientation of the corresponding icon location with respect to the reference location. A preferred embodiment pans each audio source in dependence upon an angle formed by a line segment connecting points represented by the corresponding icon location and the reference location, and a vertical line segment emanating from the reference location. For an embodiment producing a stereo auditory environment, the intensity of a right channel and the intensity of a left channel are each varied in dependence upon the angle. In another preferred embodiment, each audio source is panned in dependence upon a horizontal distance between the location of the audio source icon and the reference location. Regardless of the specific panning function employed for the stereo environment, the variable panning acts to increase the intensity of one channel and decrease the intensity of the other channel to provide a spatialized audio representation consistent with the display. Other embodiments include a quadraphonic auditory environment wherein four audio channels are produced by suitably panning the audio sources 110. One having ordinary skill in the art will recognize that a variety of panning functions can be formulated based upon the number of audio channels employed in producing the spatial auditory environment.

After variably amplifying and panning each of the audio sources 110, the audio mixer 112 forms a mixed audio signal from a combination thereof. The mixed audio signal is applied to an audio output device 122 to produce sound waves which create the virtual auditory environment. In preferred embodiments of the present invention, the audio output device 122 comprises a plurality of speakers suitably spaced apart. For a stereo auditory environment, the audio output device 122 comprises two separated speakers. For a quadraphonic virtual auditory environment, the audio output device 122 comprises four separated speakers which surround the user.

The system of FIG. 6 also includes an audio input device 124 to allow the user to generate an audio source for application to a like audio mixer in a like system for creating a spatial auditory environment. For an audio input device 124 comprising a microphone or the like, the system can be used for audio conferencing between a plurality of users. In the resulting system, each user has the ability to personalize his/her spatial auditory environment by using the graphical user interface 120 to place each of the other users at corresponding locations in the display space.

Figure 7:
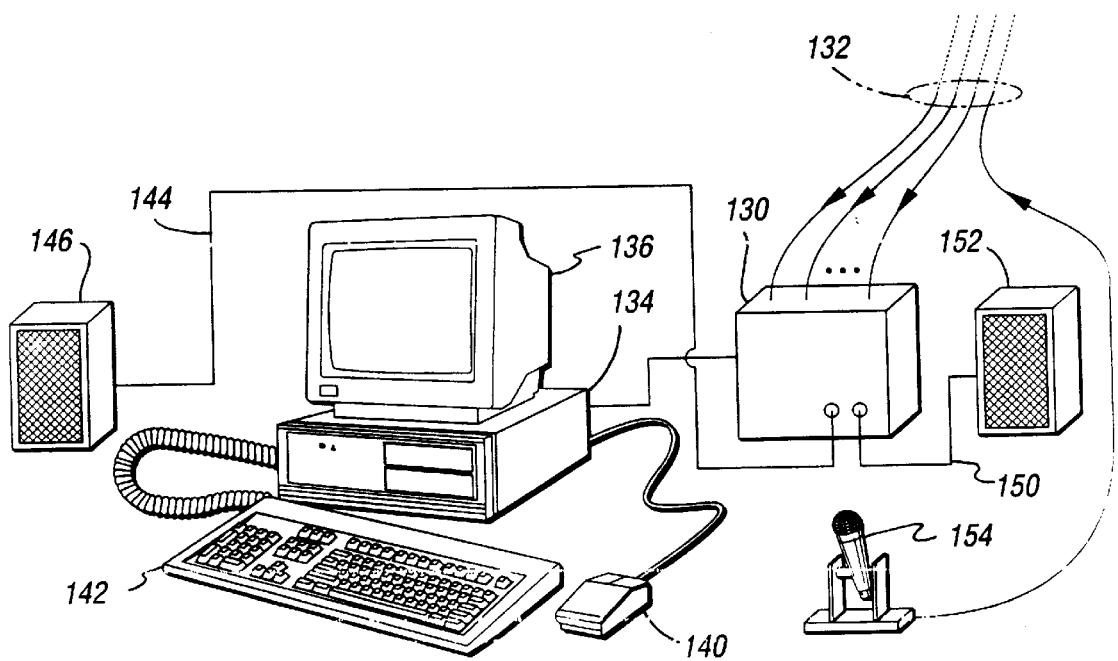
FIG. 7 is a pictorial illustration of an embodiment of the present invention.

A pictorial illustration of an embodiment of the present invention is shown in FIG. 7. This embodiment includes an electronically-controllable audio mixer 130 which is coupled to a plurality of lines 132 coming from a plurality of audio sources. The audio mixer 130 is controlled by a control signal generated by a computer 134. The computer 134 is coupled to a display device such as a computer monitor 136, and an input device such as a mouse 140 or a keyboard 142. With the computer 134 executing a suitable software or firmware program, a reference icon and the audio source icons are displayed at corresponding locations on the monitor 136. The mouse 140 allows a click-and-drag operation to be performed to modify the location of a selected icon. The computer 134 processes the modification to provide the control signal in dependence upon the corresponding location of each icon with respect to a reference location. The audio mixer 130 variably amplifies, pans, and mixes the audio sources to provide a stereo mixed audio signal. A first channel 144 of the stereo mixed audio signal is applied to a first speaker 146 and a second channel 150 of the stereo mixed audio signal is applied to a second speaker 152. The two speakers 146 and 152 provide the spatial auditory environment. As with the embodiment of FIG. 6, this embodiment also includes a microphone 154 to allow the user to generate an audio source for application to a like embodiment of the invention.

Figure 8A:
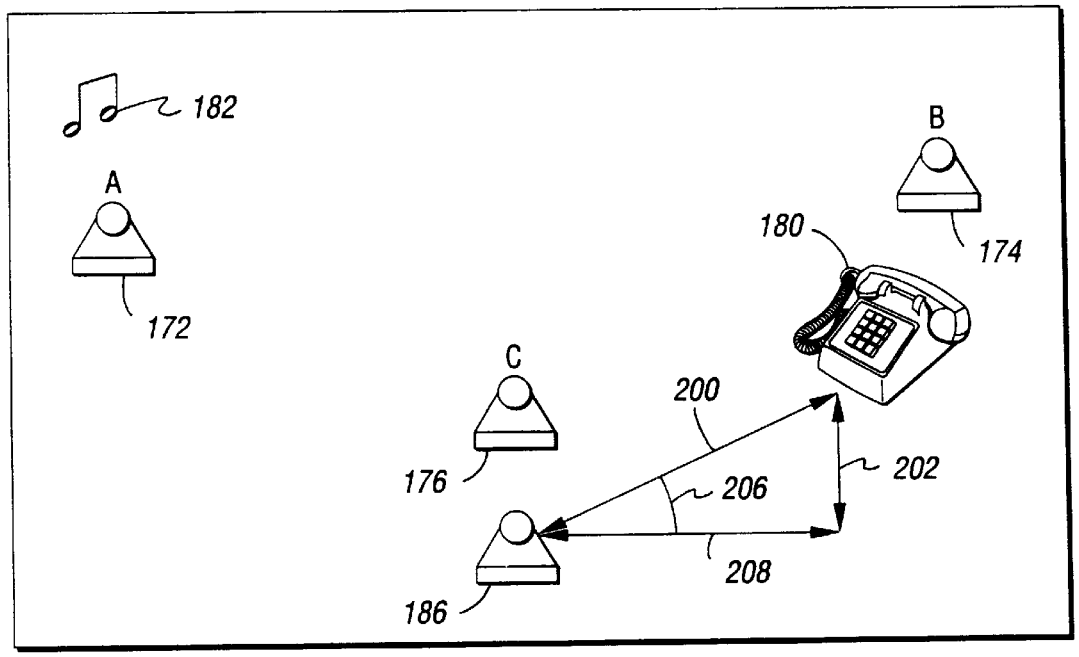
FIG. 8(a–b) is a display by the graphical user interface, and a perspective illustration of a corresponding virtual auditory environment.
Figure 8B:
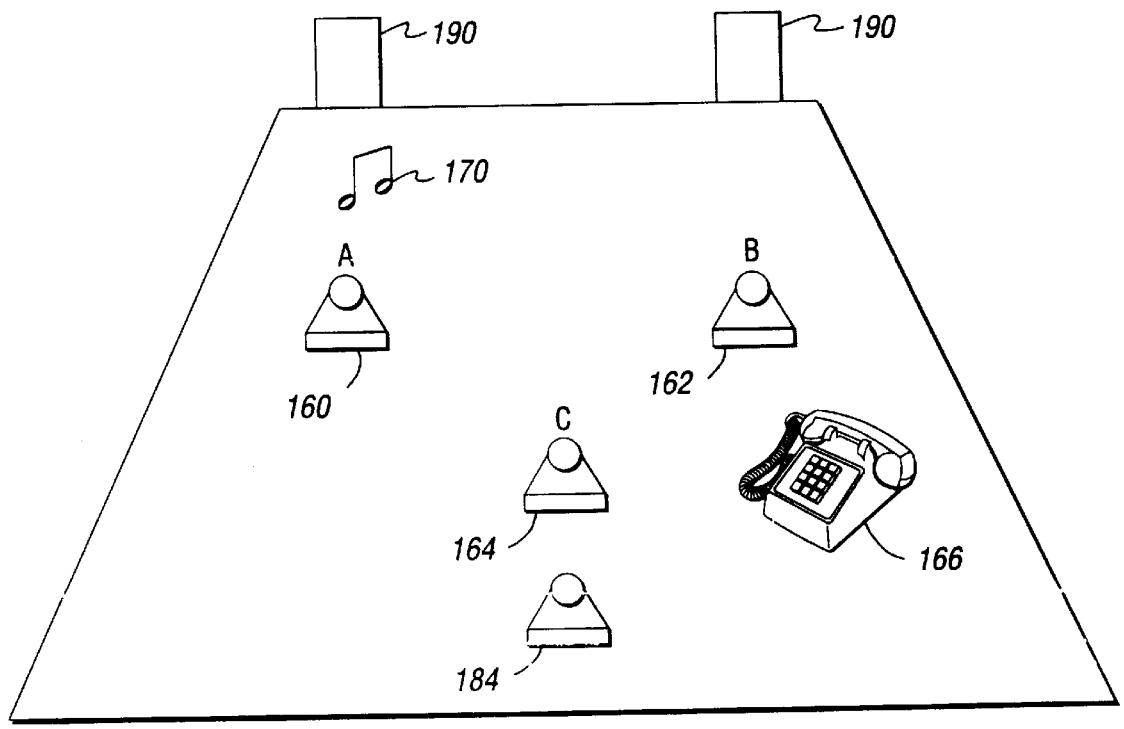

FIG. 8a shows an example display by the graphical user interface which produces a spatial auditory environment illustrated by the perspective drawing in FIG. 8b. For the purpose of illustration, as shown in FIG. 8b, the audio sources include three remotely-located persons A, B, and C, indicated by reference numerals 160, 162, and 164, respectively, a telephone receiver 166, and a music playback system 170. As shown in FIG. 8a, each of these audio sources are represented by a corresponding icon by the graphical user interface; displayed are three icons 172, 174, and 176 representative of the three remotely-located persons, a telephone receiver icon 180, and a music icon 182. A user 184 is represented by a reference icon 186.

The spatial auditory environment is created by sound waves emanating from a pair of speakers 190. The location of each of the audio sources in the virtual auditory space is dependent upon the location of the corresponding icon on the display. In terms of the illustration, the user 184 desires the music to be in the background and off to his/her left; hence he/she locates the music icon 182 distant and to the left of the reference icon 186. The person C icon 176 is located near the reference icon 186 since, for the purpose of illustration, the user is currently conversing with person C 164. The icons for persons A and B, indicated by reference numerals 172 and 174, are located away from the reference icon and at opposite sides of the display. This allows either of persons A or B to verbally get the attention of the user, and furthermore, the user can spatially distinguish between persons A and B.

In accordance with the present invention, a method of creating a virtual auditory environment from a plurality of audio sources is illustrated by the flow chart of FIG. 9. The step of displaying a representative icon for each of the audio sources is performed by block 194. The step of displaying can further include a step of displaying a reference icon at a reference location. In block 196, each of the audio sources is amplified in dependence upon the location of the corresponding icon with respect to a reference location. As discussed previously, each audio source is amplified in dependence upon a distance between the location of the corresponding icon and the reference location, with preferred embodiments employing either a Cartesian distance metric or a distance measured along a coordinate axis. Referring back to FIG. 8a, the Cartesian distance between the telephone icon 180 and the reference icon 186 is indicated by reference numeral 200, while the distance measured along the vertical axis is indicated by reference numeral 202.

The step of panning each of the audio sources in dependence upon the location of the corresponding icon with respect to a reference location is performed in block 204. As discussed previously, this step can be performed by panning each audio source in dependence upon an angle, indicated for the telephone icon 180 by reference numeral 206 in FIG. 8a, formed by a line segment between the location of the icon and the reference location and a horizontal line segment passing through the reference location. Alternatively, each audio source can be panned in dependence upon a distance 208, between the location of the icon and the reference location, measured along a coordinate axis such as the horizontal axis.

In block 210, the amplified and panned audio sources are mixed. Sound waves representative of the mixed audio sources are then produced in block 212. These sound waves create the spatial auditory environment.

Figure 10:
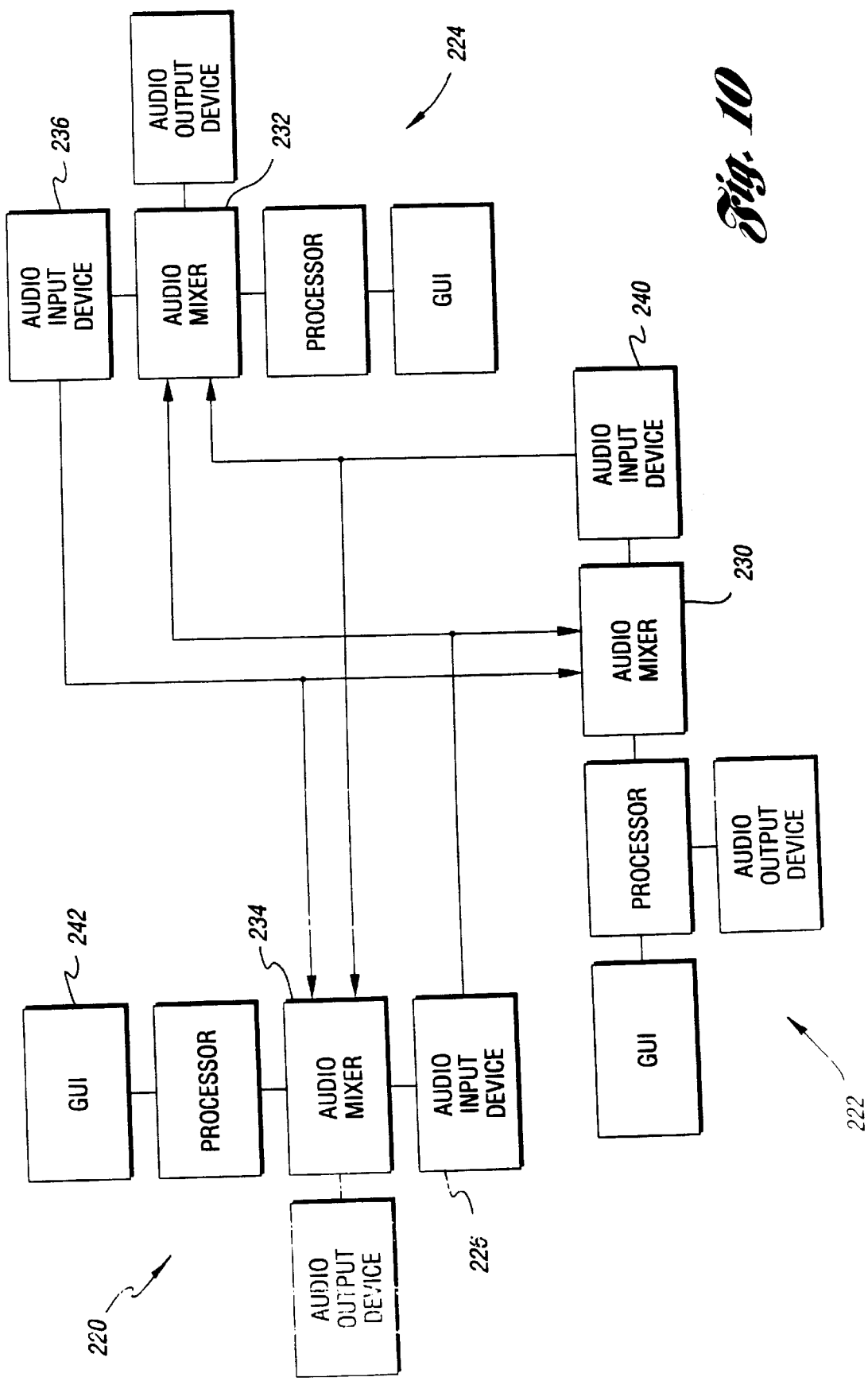
FIG. 10 is a block diagram of an embodiment of an audio conferencing system in accordance with the present invention.

In accordance with the present invention, FIG. 10 illustrates a block diagram of an embodiment of an audio conferencing system. The system is illustrated in terms of three spatial auditory systems 220, 222, and 224. The audio input device of each of the spatial auditory systems is applied as an input to the audio mixer of the other two spatial auditory systems. For example, audio input device 226 of spatial auditory system 220 is coupled to audio mixer 230 of spatial auditory system 222 and to audio mixer 232 of spatial auditory system 224. Hence, for audio input device 226 comprising a microphone, a user of spatial auditory system 220 can verbally communicate to users of spatial auditory systems 222 and 224.

As a result, the audio mixer of each of the spatial auditory systems is coupled to the audio input device of each of the other two spatial auditory systems. More specifically, for spatial auditory system 220, an audio mixer 234 is coupled to an audio input device 236 and an audio input device 240. Hence, the user of the spatial auditory system 220 is capable of modifying the spatial auditory location of each of the other two users by modifying the location of an icon representative of one of the other users using a graphical user interface 242.

A block diagram of an alternative embodiment of an audio conferencing system in accordance with the present invention is shown in FIG. 11. For the purpose of illustration, the system is illustrated in terms of three spatial auditory systems 250, 252, and 254. In this embodiment, audio mixers 256 and a processor 260 are centrally located for coupling with auditory systems 250, 252, and 254. Such an arrangement is conducive when each user is capable of modifying only the reference location of his/her reference icon. More specifically, each of the users view a common display space on a corresponding graphical user interface. When a user modifies the location of his/her reference icon, the central processor 260 commands the other graphical user interfaces to modify the location of the icon representative of the user. The central processor 260 generates control signals in dependence upon the relative locations of each icon with respect to one another for application to the audio mixers 256. In response to the control signals, the audio mixers variably amplify and pan each of the audio sources to form mixed audio signals for application to the audio output devices.

Of course, one will recognize that the three-user examples given in FIGS. 10 and 11 are merely illustrations of embodiments of the audio conferencing system, and that embodiments of the audio conferencing system can be used for any plurality of users. Moreover, embodiments of the audio conferencing system can be coupled to any generic transmitter-receiver pair, i.e. a transceiver.

The previously described versions of the present invention have many advantages, including the ability to allow a user to arrange and manipulate an auditory environment by moving or placing representations of the sound sources in a coherent and consistent spatialized representation. For example, moving a representation of a person closer and to the left of a representation of a user moves the audio representation of that person closer and to the left of the user. This allows a user complete control over the audio environment and presents an affordance for simply and quickly rearranging that audio space. It also provides a new model for creating virtual spaces of communication through coherent audio and conceptual representations.

While the best mode for carrying out the invention has been described in detail, those familiar with the art to which this invention relates will recognize various alternative designs and embodiments for practicing the invention as defined by the following claims.

What is claimed is:

1. A system for audio communication between a plurality of users at a plurality of sites, the system comprising:
   a set of audio input sensors at each site, each set of audio input sensors binaurally sensing an auditory space in proximity thereto;
   means for providing a metaphorical representation of each of the sites, each metaphorical representation being moveable by a user to a position within a metaphorical space;
   means for combining the auditory space sensed at each site to form at least one synthetic auditory space, the at least one synthetic auditory space formed in dependence upon the position of each metaphorical representation within the metaphorical space; and
   means for producing a binaurally-perceivable auditory environment at each site based upon the at least one synthetic auditory space.

2. The system of claim 1 wherein the metaphorical space is delineated into a plurality of subspaces for metaphorically representing each synthetic auditory space.

3. The system of claim 2 wherein one synthetic auditory space is formed by combining the auditory space of at least one site having a metaphorical representation contained within a predetermined subspace.

4. The system of claim 1 wherein the auditory space sensed at one site is produced at a binaurally-perceived position at another site dependent upon the position of the metaphorical representation of the one site within the metaphorical space.

5. The system of claim 1 wherein the means for providing the metaphorical representation provides a physical representation of at least one of the sites.

6. The system of claim 5 wherein the means for providing the metaphorical representation includes:
   at least one physical object for metaphorically representing the at least one of the sites, each physical object having a position which is variable within a physical space; and
   means for sensing the position of the at least one physical object within the physical space.

7. The system of claim 6 wherein the at least one physical object is positionable on a planar surface.

8. The system of claim 6 wherein the at least one physical object is positionable on a plurality of planar surfaces.

9. The system of claim 1 wherein the means for providing the metaphorical representation provides a visual representation of at least one of the sites.

10. The system of claim 9 wherein the means for providing the metaphorical representation includes:
    a display device on which at least one graphical object is displayed, the at least one graphical object metaphorically representing the at least one of the sites;
    means for variably positioning the at least one graphical object on the display; and
    means for determining the position of the at least one graphical object.

11. The system of claim 1 wherein the means for providing the metaphorical representation provides an auditory representation of at least one of the sites.

12. The system of claim 11 wherein the means for providing the metaphorical representation includes:
    an auditory display on which at least one auditory object is displayed, the at least one auditory object metaphorically representing at least one of the sites;
    means for variably positioning the at least one auditory object; and
    means for determining the position of the at least one auditory object.

13. The system of claim 1 wherein the means for providing the metaphorical representation provides a textual representation of at least one of the sites.

14. The system of claim 13 wherein the means for providing the metaphorical representation includes:
    a computer executing a control program which maintains a state space model of at least one mnemonic object, the at least one mnemonic object metaphorically representing the at least one of the sites;
    means for receiving a textual command for modifying the state of the at least one mnemonic object within the state space model; and
    means for displaying a textual indication of the state of the at least one mnemonic object within the state space model.

15. The system of claim 1 wherein the set of audio input sensors at one site includes a pair of microphones configured to simulate a predetermined intracranial distance between human ears.

16. The system of claim 1 wherein the set of audio input sensors at one site includes a pair of sensors which physically simulates a predetermined binaural head-related transfer function.

17. The system of claim 1 wherein the set of audio input sensors at one site includes a pair of displacement sensors for sensing the displacement of a pair of in vivo tympanic membranes in response to the auditory space in proximity thereto.

18. The system of claim 1 wherein the means for combining includes means for convolving an auditory space sensed at one of the sites with a predetermined binaural human head-related transfer function.

19. The system of claim 1 wherein the means for combining includes at least one digital audio processor for composing the synthetic auditory space at one of the sites based upon the auditory space sensed in at least one other site.

20. The system of claim 1 wherein the means for producing the synthetic auditory environment includes at least one analog mixer for composing the synthetic auditory environment at one of the sites based upon the auditory space sensed in at least one other site.

21. The system of claim 1 wherein the means for producing the binaurally-perceivable auditory environment includes a plurality of speakers located at one of the sites.

22. The system of claim 1 wherein the means for producing the binaurally-perceivable auditory environment includes means to servo tympanic membranes of the user.

23. A method of audio communication between a plurality of users at a plurality of sites, each site having a set of audio input sensors, the method comprising:

binaurally sensing an auditory space in proximity to each set of audio input sensors;

providing a metaphorical representation of each of the sites, each metaphorical representation being moveable by a user to a position within a metaphorical space;

combining the auditory space sensed at each site to form at least one synthetic auditory space, the at least one synthetic auditory space formed in dependence upon the position of each metaphorical representation within the metaphorical space; and producing a binaurally-perceivable auditory environment at each site based upon the at least one synthetic auditory space.

24. The method of claim 23 wherein the metaphorical space is delineated into a plurality of subspaces for metaphorically representing each synthetic auditory space.

25. The method of claim 24 wherein one of the at least one synthetic auditory space is formed by combining the auditory space of at least one site having a metaphorical representation contained within a predetermined subspace.

26. The method of claim 23 wherein the auditory space sensed at one site is produced at a binaurally-perceived position at another site dependent upon the position of the metaphorical representation of the one site within the metaphorical space.

27. The method of claim 23 wherein the step of providing the metaphorical representation includes providing a physical representation of at least one of the sites.

28. The method of claim 27 wherein the step of providing the metaphorical representation includes:

providing at least one physical object for metaphorically representing the at least one of the sites, each physical object having a position which is variable within a physical space; and sensing the position of the at least one physical object within the physical space.

29. The method of claim 28 wherein the at least one physical object is positionable on a planar surface.

30. The method of claim 28 wherein the at least one physical object is positionable on a plurality of planar surfaces.

31. The method of claim 23 wherein the step of providing the metaphorical representation includes providing a visual representation of at least one of the sites.

32. The method of claim 31 wherein the step of providing the metaphorical representation includes:

providing a display device on which at least one graphical object is displayed, the at least one graphical object metaphorically representing the at least one of the sites;

variably positioning the at least one graphical object on the display; and determining the position of the at least one graphical object.

33. The method of claim 23 wherein the step of providing the metaphorical representation includes providing an auditory representation of at least one of the sites.

34. The method of claim 33 wherein the step of providing the metaphorical representation includes:

providing an auditory display on which at least one auditory object is displayed, the at least one auditory object metaphorically representing at least one of the sites;

variably positioning the at least one auditory object; and determining the position of the at least one auditory object.

35. The method of claim 23 wherein the step of providing the metaphorical representation includes providing a textual representation of at least one of the sites.

36. The method of claim 35 wherein the step of providing the metaphorical representation includes:

executing a control program on a computer to maintain a state space model of at least one mnemonic object, the at least one mnemonic object metaphorically representing the at least one of the sites;

receiving a textual command for modifying the state of the at least one mnemonic object within the state space model; and displaying a textual indication of the state of the at least one mnemonic object within the state space model.

37. The method of claim 23 wherein the set of audio input sensors at one site includes a pair of microphones configured to simulate a predetermined intracranial distance between human ears.

38. The method of claim 23 wherein the set of audio input sensors at one site includes a pair of sensors which physically simulates a predetermined binaural head-related transfer function.

39. The method of claim 23 wherein the set of audio input sensors at one site includes a pair of displacement sensors for sensing the displacement of a pair of in vivo tympanic membranes in response to the auditory space in proximity thereto.

40. The method of claim 23 wherein the step of combining includes convolving an auditory space sensed at one of the sites with a predetermined binaural human head-related transfer function.

41. The method of claim 23 wherein the step of combining includes:

providing at least one digital audio processor; and composing the synthetic auditory space at one of the sites based upon the auditory space sensed in at least one other site using the at least one digital audio processor.

42. The method of claim 23 wherein the step of producing the synthetic auditory environment includes:

providing at least one analog mixer; and composing the synthetic auditory environment at one of the sites based upon the auditory space sensed in at least one other site using the at least one analog mixer.

43. The method of claim 23 wherein the binaurally-perceivable auditory environment is produced using a plurality of speakers located at one of the sites.

44. The method of claim 23 wherein the step of producing the binaurally-perceivable auditory environment includes servoing tympanic membranes of the user.

45. A system for use with an audio conferencing apparatus which provides a user with a corresponding bidirectional audio communication link with each of a plurality of external transceivers, the audio conferencing apparatus containing an audio output device capable of producing sound waves from a first audio signal applied thereto, the audio conferencing apparatus further containing an audio input device capable of producing a second audio signal from sound waves received thereby for transmission to the plurality of external transceivers, the system comprising:

a graphical user interface which displays a corresponding icon for each of the external transceivers at a corresponding location in a display space, wherein the corresponding location of each icon is capable of being modified by the user;

a processor, operatively associated with the graphical user interface, which generates a control signal in dependence upon the corresponding location of each icon with respect to a reference location; and an audio mixer, operatively associated with the processor, which variably amplifies and variably pans a corresponding audio signal received from each of the plurality of external transceivers in dependence upon the control signal, and forms a mixed audio signal from a combination thereof;

wherein the mixed audio signal is applied to the audio output device to create a spatial auditory environment based upon the audio signals received from the plurality of external transceivers.

46. The system of claim 45 wherein each corresponding audio signal is amplified in dependence upon a distance between the corresponding location of the corresponding icon and the reference location.

47. The system of claim 46 wherein the distance is a Cartesian distance.

48. The system of claim 46 wherein the distance is measured along a coordinate axis.

49. The system of claim 48 wherein the coordinate axis has a generally vertical orientation.

50. The system of claim 45 wherein each corresponding audio signal is panned in dependence upon an angle between a predetermined axis and a line passing simultaneously through the corresponding location of the corresponding icon and the reference location.

51. The system of claim 45 wherein each corresponding audio signal is panned in dependence upon a distance between the corresponding location of the corresponding icon and the reference location.

52. The system of claim 51 wherein the distance is measured along a coordinate axis.

53. The system of claim 52 wherein the coordinate axis has a generally horizontal orientation.

54. The system of claim 45 wherein the graphical user interface is further capable of displaying a reference icon at the reference location in the display space.

55. The system of claim 54 wherein the graphical user interface further allows the user to modify the reference location of the reference icon.

56. The system of claim 45 wherein the mixed audio signal is a stereo audio signal.

57. The system of claim 45 wherein the audio output device comprises a plurality of speakers.

58. A method of bidirectional communication with each of a plurality of external transceivers, the method comprising the steps of:

transmitting a first audio signal to each of the plurality of external transceivers;

displaying a corresponding icon for each of the external transceivers at a corresponding location in a display space;

receiving a corresponding audio signal from each of the plurality of external transceivers;

amplifying and panning each corresponding audio signal in dependence upon the corresponding location of the corresponding icon with respect to a reference location;

mixing the amplified and panned corresponding audio signals to form a mixed audio signal; and applying the mixed audio signal to an audio output device to create a spatial auditory environment based upon the audio signals received from the plurality of external transceivers.

59. The method of claim 58 further comprising the step of modifying the corresponding location of at least one icon.

60. The method of claim 58 wherein each corresponding audio signal is amplified in dependence upon a distance between the corresponding location of the corresponding icon and the reference location.

61. The method of claim 60 wherein the stance is a Cartesian distance.

62. The method of claim 60 wherein the distance is measured along a coordinate axis.

63. The method of claim 62 wherein the coordinate axis has a generally vertical orientation.

64. The method of claim 58 wherein each corresponding audio signal is panned in dependence upon an angle between a predetermined axis and a line passing simultaneously through the corresponding location of the corresponding icon and the reference location.

65. The method of claim 58 wherein each corresponding audio signal is panned in dependence upon a distance between the corresponding location of the corresponding icon and the reference location.

66. The method of claim 65 wherein the distance is measured along a coordinate axis.

67. The method of claim 66 wherein the coordinate axis has a generally horizontal orientation.

68. The method of claim 58 wherein the step of displaying comprises displaying a reference icon at the reference location in the display space.

69. The method of claim 68 wherein the step of displaying further comprises allowing the user to modify the reference location of the reference icon.

70. The method of claim 58 wherein the mixed audio signal is a stereo audio signal.

* * * * *